Feb. 18, 1947. K. M. LEE ET AL 2,416,012
LOADING MECHANISM FOR TESTING MACHINES
Filed April 19, 1944 2 Sheets-Sheet 1

INVENTORS
MARK F. LINDSEY
KENNETH M. LEE
BY
Bruno C. Lechler
ATTORNEY

Patented Feb. 18, 1947

2,416,012

UNITED STATES PATENT OFFICE 2,416,012

LOADING MECHANISM FOR TESTING MACHINES

Kenneth M. Lee, East Moline, and Mark F. Lindsey, Moline, Ill., assignors to American Machine and Metals, Inc., East Moline, Ill., a corporation of Delaware Application April 19, 1944, Serial No. 531,766

19 Claims. (Cl. 73—95)

This invention relates to testing machines. More specifically, the invention relates to that type of testing machines in which the load is applied to the specimen to be tested in a gradually increasing amount determined by the amount of solid particles of mass discharging from a container and in which the flow of particles from said container is automatically terminated upon the rupture of the specimen.

In machines of this kind the container for the particles of mass, generally round shot, is hung from a scale beam and has a discharge opening controlled by a gate. The gate is open while stress is applied to the specimen but is supposed to close immediately upon the rupture of the specimen. This type of testing machine is usually called the "automatic shot type."

At the outset of a test the container is filled with the proper quantity of particles of mass to balance the scale beam. To carry out a test the gate is opened so that particles of mass flow out of the container whereby the specimen placed in the machine is subjected to a gradually increasing stress. The scale beam which is held approximately level while this gradually increasing stress is acting on the specimen, swings out violently as soon as the specimen breaks. This sudden movement of relatively great magnitude of the scale beam is utilized for closing the gate on the container in order to prevent any further outflow of particles of mass.

In the testing machines of this type as heretofore used usually a spring is provided to open the gate, whereas closing of the gate is achieved by positive means acting against the spring. Since during the operation of the machine the scale beam is usually oscillating unless the operator keeps it exactly level by constantly adjusting the specimen holder, the spring is compressed each time the container suspended from the oscillating scale beam makes an upward movement. Thus a part of the load on the scale beam is intermittently provided by the compressed spring and an error is introduced. Another cause for inaccuracy of the result obtained with testing machines equipped with the mechanism just mentioned lies therein that when the specimen ruptures and the scale beam with the shot container jerks up, it frequently happens that a shot becomes caught in the discharge opening by the gate. As a result, the gate cannot close completely and some additional shot may discharge, causing an incorrect reading.

It is an object of the invention to provide a testing machine of the automatic shot type which is free from the sources of error just mentioned.

It is a further object of the invention to provide a testing machine of the automatic shot type wherein the discharge opening of the container is closed by raising the gate.

It is a further object of the invention to provide a testing machine of the automatic shot type wherein the load is applied by shot flowing over a dam which can be raised to terminate the flow.

A further object of the invention resides in the provision of a testing machine of the automatic shot type wherein that part of the gate which is movable in front of the discharge opening is arranged at some distance from the wall in which said discharge opening is provided.

A further object of the invention is to provide a testing machine of the automatic shot type wherein for controlling the flow of the solid particles of mass through the discharge opening a vertically movable barrier is used which is situated at a distance from the wall in which said discharge opening is provided and which terminates the flow of particles through the opening when brought into a position in which it intersects the angle of repose of the particles.

Another object of the invention is to provide a testing machine of the automatic shot type wherein the load is applied by particles of mass flowing from the container into an internal well and through a hollow gate adapted to move within said well.

Still another object of the invention is to provide a testing machine of the automatic shot type in which a spring instead of positive means is used for closing the gate, the gate being so constructed that a spring light enough to be compressed by the finger of the operator will suffice to close the gate.

A further object of the invention is to provide a testing machine in which the spring just mentioned is held in its compressed position by latching means until the latter are tripped due to a substantial upward movement of the container, such as the movement which will occur upon the rupture of the specimen.

A further object of the invention is to provide a testing machine in which a lost motion device is used to release the spring when the oscillations of the scale beam exceed a certain preset limit.

Still a further object of the invention is to provide a testing machine in which the spring used for closing the gate is so disposed that it cannot impose any load upon the scale beam while this scale beam is oscillating within a preset range.

Other objects of the invention will appear as the description proceeds, reference being had to the accompanying drawings which illustrate by way of example one embodiment of the invention and in which.

Figure 1:
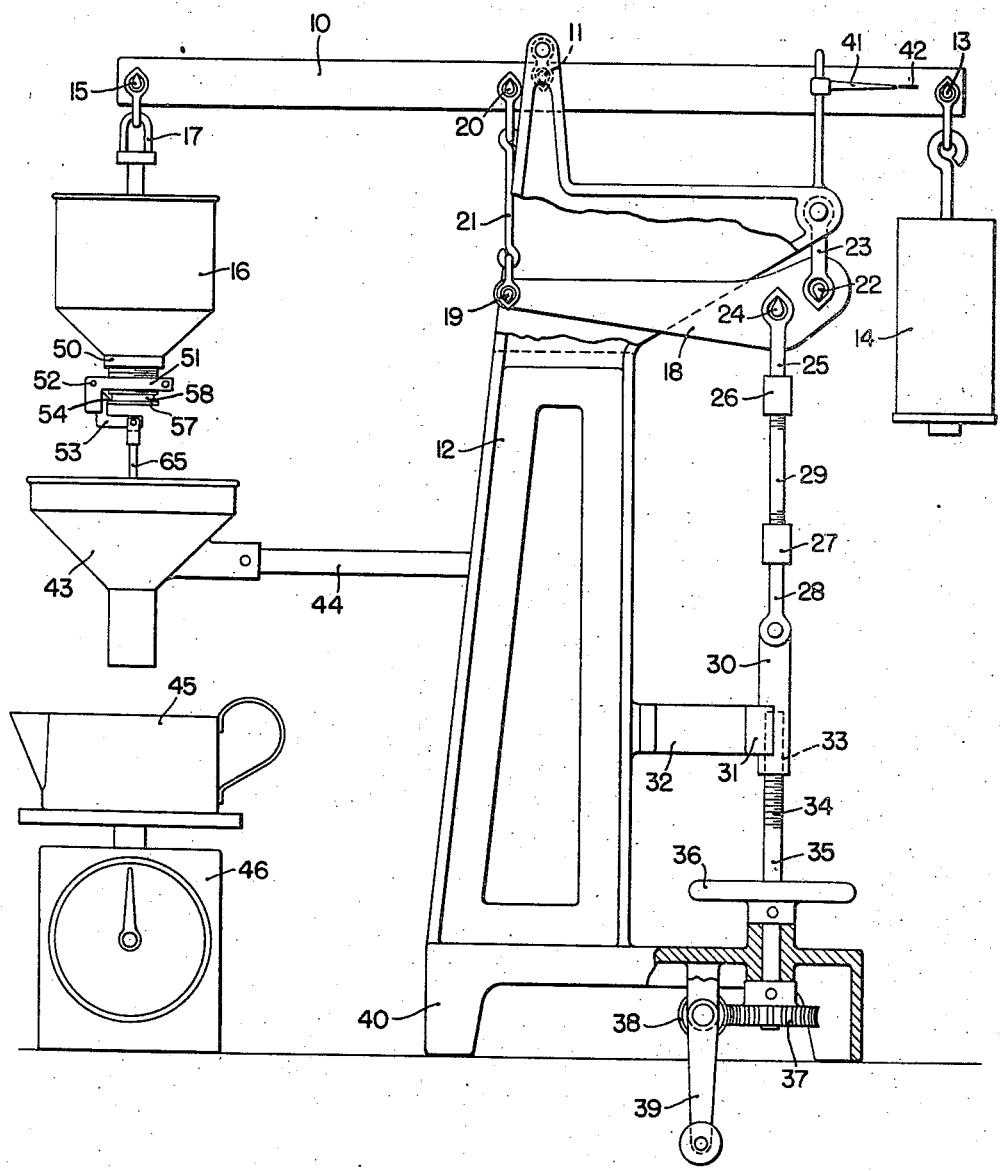
Fig. 1 is a vertical elevation, partly in section, of a testing machine.

10 represents a scale beam which is pivotally mounted on a knife edge 11 carried by a stationary frame 12. From a knife edge 13 at one end of the beam 10 a fixed weight 14 is suspended and at the other end of the beam a bucket 16 is hung from a knife edge 15 by means of a hook 17 or the like. A lever 18 has its one end 19 suspended from a knife edge 20 on the scale beam 10 by means of a link 21, whereas its other end 22 is linked to the stationary frame 12 by a link 23. The knife edge 20 is arranged close to the fulcrum 11 of the scale beam 10 and to the same side of this fulcrum as the knife edge 15 supporting the bucket 16. At an intermediate point of the lever 18 a knife edge 24 is arranged which carries a holding member 25 provided with a threaded socket 26. This socket, together with a likewise threaded socket 27 of a second holding member 28 is adapted to receive the specimen 29 to be tested. The holding member 28 which supports the lower end of the specimen is connected to a vertically movable rod 30 which may be of rectangular, square, or other non-circular cross-section and is guided in a correspondingly shaped end portion 31 of an arm 32 attached to the frame 12. The lower end of the rod 30 has an internally threaded portion 33 receiving the threaded portion 34 of a spindle 35 which carries a hand wheel 36 as well as a worm wheel 37. The worm wheel 37 meshes with a worm 38 which is supported in the base 40 of the frame 12 and can be actuated by a crank 39.

The scale beam 12 carries a mark 42 which is in line with an indicator 41 carried by the stationary frame 12 when the scale beam is balanced.

The bucket 16 hangs directly above a funnel 43 which is carried by a bracket 44 attached to the frame 12. Below the funnel 43 a collecting can 45 is placed on a scale 46. The collecting can 45 receives the particles of mass discharged from the bucket 16 and passing through the funnel 43. Since the stress exerted upon the specimen to be tested is proportional to the weight of the particles discharged from the bucket 16, the scale 46 may be graduated to read directly the amount of said stress rather than the actual weight of the shot in the can 45.

The bucket 16 has an inset in the form of a cylindrical well 47 in which one or more openings 48 are provided at a certain height, preferably near the lower end of the bucket 16. The cylindrical well 47 has a threaded end portion 49 which is screwed into a cylindrical portion 50 of the bucket 16 and extends downwardly beyond the bucket. Upon the threaded extension 49 of the cylinder 47 a collar 51 is screwed which carries a pin 52 serving as a pivot for a lever 53 having a latch 54. Suspended from the lever 53 is a rod 65 carrying a spider 55 which in the balanced position of the scale beam 10 is situated a certain distance below the lower edge 56 of the stationary funnel 43.

A slide valve 58 is carried by a rod 59 passing through a ring 60 secured by means of a bolt 61 to the cylinder 47. The ring 60 forms a lower rest for a spring 61 which surrounds the rod 59 and bears against an upper abutment 62 secured to the rod 59, such as by a screw 63. The latch 54 on the lever 53 is adapted to engage a flange 57 of the annular valve 58 when the latter is in its lowered position shown in Fig. 2 so as to prevent the valve from moving upwardly relative to the bucket 16 under the action of the spring 61. A spring 66 tends to hold the latch 54 in engagement with the flange 57.

Figure 2:
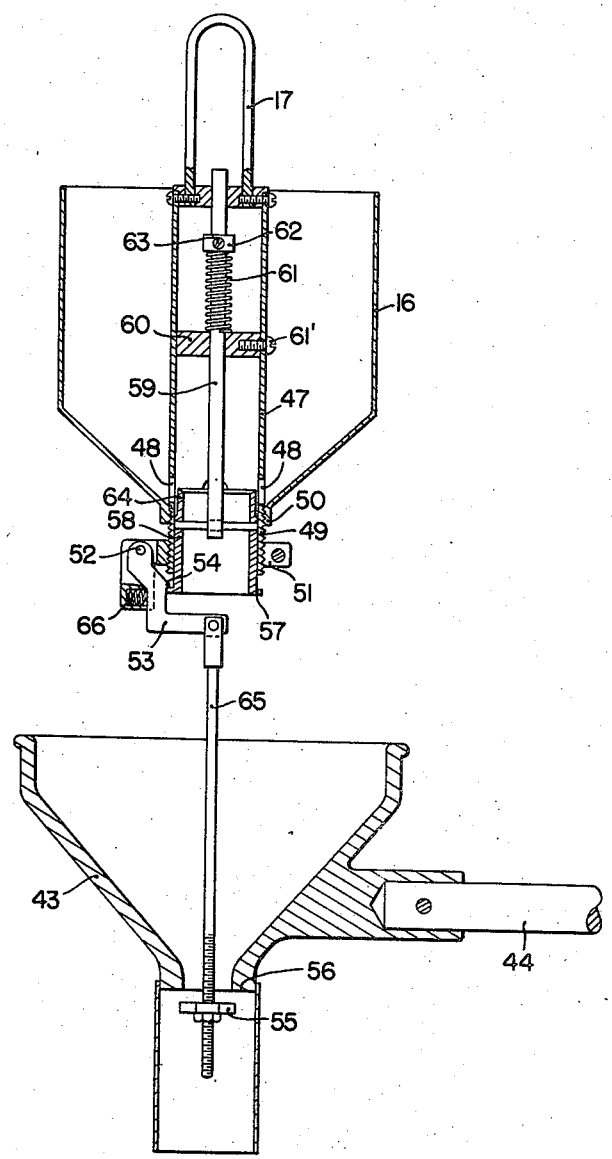
Fig. 2 is a vertical section on a larger scale through a portion of the machine shown in Fig. 1.

The valve 58 is shown in Fig. 2 as being of annular shape adapted to move vertically within the cylindrical well 47 and to control a plurality of openings 48 distributed around the circumference of the cylinder 47. If the opening or openings were arranged in a vertical wall being in the form of, e. g., a flat plate, the slide valve could also be a substantially flat plate. However, whether in the form of a plate or in the form of a tube of circular or other cross-section, the slide valve 58 has its upper part 64 shaped so as not to contact the wall but being spaced a small distance therefrom. In the example shown, the upper part 64 of the slide valve 58 has an outer diameter which is somewhat smaller than the inner diameter of the cylindrical well 47. The lower part of the slide valve 58 forms an apron extending from the part 64 of reduced diameter to the wall of the cylinder 47.

To use the machine, the bucket 16 is filled with the correct amount of shot to bring the scale beam 10 into balance and a specimen 29 is placed between the holders 25, 26 and 27, 28. By turning the hand wheel 36 any slack present can be taken up. If the slide valve 58 happens to be in its closed position, as it usually will be at the end of a test previously made, the operator presses momentarily with his finger upon the top of the rod 59, compressing thereby the spring 61 and moving the valve 58 down far enough so that the flange 57 passes the latch 54 and is caught by the latter when the operator releases the rod 59. The valve 58 is now held in its lowered position shown in Fig. 2 in which it permits passage of shot contained in the bucket 16 through the openings 48 in the cylinder 47 and through the interior of the valve 58 itself. The shot so discharged falls down into the funnel 43 and through the bottom opening thereof into the measuring can 45.

As shot flows out of the bucket 16, the weight acting upon the left end of the scale beam 10 becomes smaller and is no longer able to balance the fixed weight 14 at the other end of the beam 10. This places a stress on the specimen 29 which begins to stretch. To hold the scale beam 10 level during the test, the stretch of the specimen is compensated for by moving the spindle 35 by means of the crank 39 to such an extent that the mark 42 remains approximately in alignment with the indicator 41.

When the specimen 29 finally breaks, the weight 14 is free to fall and the bucket 16 is moved up suddenly and violently. The spider 55 hanging down from the bucket 16 will at first follow the upward movement of the bucket, but only for the short distance determined by the distance the spider 55 has from the lower face 56 of the funnel 43. As soon as the spider 55 reaches this face 56 it can no longer participate in the continued upward movement of the bucket 16 and, being linked to the lever 53 whose pivot 52 is moving upwardly with the bucket 16, it will rock said lever 53. The lever 53 is thus swung about its pivot 52 so that its latch 54 moves out of the path of the flange 57 of the valve 58, releasing thereby the spring 61 to expand. The expanding spring 61 acting against the abutment 62 moves the valve 58 upwardly into a position in which the top of the valve is above the top of the openings 48 or at least at a height at which it intersects the angle of repose of the particles in the container. Since these particles are of a solid nature the lifting of the valve to the height just mentioned will interrupt the flow through the openings 48 even though on account of the reduced diameter of the upper part 64 of the valve 58 the openings are not closed tightly.

Since there is no contact between the reduced portion 64 of the valve 58 and the inner surface of the cylinder 47 there is no danger for the valve to become jammed by shot caught in the openings 48. It will be apparent that such an arrangement permits operation of the valve with such little friction that a finger-stressed spring 61 can be relied upon for closing the valve and no positive closing means such as have been necessary in previous structures of testing machines of the automatic shot type are required.

The lost motion provided by the arrangement of the spider 55 a certain distance below the stop 56, which permits the scale beam 10 to perform movements of moderate size unrestrainedly and without actuating the valve releasing mechanism, also assures that no load can be imposed on the scale beam by variations in the compression of the spring 61. This compression remains unchanged regardless of changes in the position of the scale beam 10 and of the position of the bucket 16 moving with that beam as long as the latch 54 is not tripped. By screwing the spider 55 lower down or higher up on the rod 65 the amount of lost motion may be increased or reduced.

The extent to which the valve 58 opens the openings 48 when held in its open position by the latch 54 and thereby the rate of flow of the shot through said openings may be adjusted by screwing the collar 51 up or down on the threaded end 49 of the cylinder inset 47. As has been mentioned above, solid particles of mass will not flow through the openings 48 until the upper edge of the valve 58 has arrived below the angle of repose of the particles and that the flow through these openings will be terminated by the raising valve as soon as the top of the valve is above said angle of repose, no sliding contact between the valve and the openings 48 being necessary.

While we have shown and described the invention in its application to that particular form of a testing machine of the automatic shot type in which a fixed weight is arranged at one end of the scale beam, it is to be understood that this particular embodiment has been given by way of example only and that the invention is applicable to any testing machine of the automatic shot type. It will further be understood that various changes and modifications may be made in the details of the construction shown without departing from the spirit of the invention or from the scope of the appended claims.

What we claim is:

1. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam a cylindrical well in said container open at the bottom, a discharge opening in said container leading into said well, a vertically movable gate for controlling flow through said discharge opening, means biasing the gate to move upward in the well to shut off the flow of particles through the discharge opening, and latching means carried by said container for holding said gate in its lowered position until tripped due to a substantial upward movement of said container.

2. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, an annular discharge opening in said container, a vertically movable gate for controlling said discharge opening, latch-means carried by said container for holding said gate in its lowered position until tripped due to a substantial upward movement of said container, and means for raising said gate, when so tripped, to terminate the flow of said particles of mass through said discharge opening.

3. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, a discharge opening in said container, a vertically movable gate for controlling said discharge opening, latching means carried by said container for holding said gate in its lowered position in which said discharge opening is open, and a spring mounted to move said gate upwardly into its closing position upon said latching means being tripped due to a substantial upward movement of said container.

4. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, an annular discharge opening in said container, a vertically movable hollow gate permitting, when in its lowered position, passage of said particles of mass through said discharge opening and through the interior of said gate, means biasing the gate to move upward to shut off the flow of particles, and latching means carried by said container for holding said gate in its lowered position until tripped due to a substantial upward movement of said container.

5. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, an annular discharge opening in said container, a vertically movable hollow gate permitting, when in its lowered position, passage of said particles of mass through said discharge opening and through the interior of said gate, latching means carried by said container for holding said gate in said lowered position, and a spring mounted to move said gate upwardly in its closing position upon said latching means being tripped due to an upward movement of said container exceeding a preset limit.

6. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, a discharge opening in said container, a vertically movable gate for controlling said discharge opening, a spring placed between a lower rest rigidly connected to said container and an upper abutment rigidly connected to said gate for moving said gate upwardly to terminate the flow of said particles of mass through said discharge opening, and latching means carried by said container for holding said gate in its lowered position until tripped due to a substantial upward movement of said container.

7. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, an annular discharge opening in said container, a vertically movable hollow gate permitting, when in its lowered position, passage of said particles of mass through said discharge opening and through the interior of said gate, a spring placed between a lower rest rigidly connected to said container and an abutment rigidly connected to said gate for moving said gate upwardly to terminate the flow of said particles, and latching means carried by said container for holding said gate in said lowered position until tripped due to a substantial upward movement of said container.

8. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, a discharge opening in said container, a vertically movable gate for controlling said opening, latching means for normally holding said gate in its lowered, open position, means for tripping said latching means, and a spring so mounted as to be subjected to a force which remains constant as long as said gate is held open by said latching means, but to expand and move said gate upwardly upon said latching means being tripped.

9. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, a discharge opening in said container, a vertically movable gate adapted to be raised to terminate the flow of said particles of mass through said discharge opening, means biasing the gate upward shutting off the flow of particles, a fixed stop, and a movable part suspended from said container and situated, when said scale beam is balanced, a preset distance below said fixed stop so as to be able to follow unrestrainedly upward movements of said container which are small compared with the upward movement said container performs when said specimen ruptures, said movable part being operatively connected to a latch for holding said gate in its lowered position, said latch being adapted to be tripped upon said movable part being blocked by said stop while said container is still moving upwardly.

10 In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, a discharge opening in said container, a vertically movable gate adapted to be raised to terminate the flow of said particles of mass through said discharge opening, means biasing the gate upward shutting off the flow of particles, a fixed stop, a movable part suspended from said container and situated, when said scale beam is balanced, a preset distance below said fixed stop so as to be able to follow unrestrainedly upward movements of said container which are small compared with the upward movement said container performs when said specimen ruptures, said movable part being operatively connected to a latch for holding said gate in its lowered position, said latch being mounted on a vertically adjustable collar threaded on the lower end of said container and being adapted to be tripped upon said movable part being blocked by said stop while said container is still moving upwardly.

11. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, a discharge opening in said container, a vertically movable gate for controlling the flow of said particles of mass through said discharge opening, means locking the gate in its lower position, a fixed stop, a movable part suspended from said locking means and situated, when said scale beam is balanced, a preset distance below said fixed stop so as to be able to follow unrestrainedly vertical upward movements of said container which are small compared with the upward movement said container performs when said specimen ruptures, and a spring mounted to move said gate upwardly into its closing position upon said locking means having been tripped by the upward movement of the container causing the movable part to engage the fixed stop thereby permitting said gate to be raised by the action of the spring even while the container is still moving upward.

12. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, a discharge opening in said container, a vertically movable gate for controlling the flow of said particles of mass through said discharge opening, a fixed stop, a movable part suspended from said container and situated, when said scale beam is balanced, a preset distance below said fixed stop so as to be able to follow unrestrainedly vertical upward movements of said container which are small compared with the upward movement said container performs when said specimen ruptures, a spring placed between a lower rest rigidly connected to said container and an upper abutment rigidly connected to said gate, said movable part being operatively connected to a latch for holding said gate in its lowered position, said latch being adapted to be tripped upon said movable part being blocked by said stop while said container is still moving upwardly releasing thereby said gate for being raised by the action of said spring.

13. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, a discharge opening in said container, a vertically movable gate for controlling the flow of said particles of mass through said discharge opening, a fixed stop, a movable part suspended from said container and situated, when said scale beam is balanced, a preset distance below said fixed stop so as to be able to follow unrestrainedly vertical upward movements of said container which are small compared with the upward movement said container performs when said specimen ruptures, a spring placed between a lower rest rigidly connected to said container an an upper abutment rigidly connected to said gate, said movable part being operatively connected to a latch for holding said gate in its lowered position, said latch being pivotally mounted on a vertically adjustable collar threaded on the lower end of said container and being adapted to be tripped upon said movable part being blocked by said stop while said container is still moving upwardly releasing thereby said gate for being raised by the action of said spring.

14. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, a tubular inset in said container, at least one discharge opening in said inset at a given height thereof, a vertically movable tubular valve slidable in said inset, a latch carried by said container for normally holding open said valve, and means for raising the top of said valve near to, or above, the top of said openings so as to terminate the flow of said particles of said mass through said discharge openings when said valve is released from said latch.

15. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, a tubular inset in said container, at least one discharge opening in said inset at a given height thereof, a vertically movable tubular valve slidable in said inset, a latch carried by said container for normally holding open said valve, means for tripping said latch, and a spring so mounted as to be subjected to a force remaining constant as long as said valve is held open by said latch but to expand and move said valve upwardly upon said latch being tripped.

16. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, a tubular inset in said container, at least one discharge opening in said inset at a given height thereof, a vertically movable tubular valve slidable in said inset, a latch carried by said container for normally holding open said valve and means for raising the top of said valve near to, or above, the top of said openings so as to terminate the flow of said particles of said mass through said discharge openings when said valve is released from said latch, the outer diameter of the upper portion of said tubular valve being smaller than the inner diameter of said inset.

17. In a testing machine of the type in which the load is applied to the specimen to be tested in a gradually increasing amount determined by the amount of solid particles of mass discharging from a container and in which the flow of particles from said container is automatically terminated upon the rupture of the specimen, in combination: a scale beam, a container carried by said beam, a tubular inset in said container, at least one discharge opening in said inset at a given height thereof, a vertically movable tubular valve slidable in said inset, a latch carried by said container for normally holding open said valve, means for tripping said latch, and a spring so mounted as to be subjected to a force remaining constant as long as said valve is held open by said latch but to expand and move said valve upwardly upon said latch being tripped, the outer diameter of the upper portion of said tubular valve being smaller than the inner diameter of said inset.

18. In a testing machine of the type in which the load is applied to the specimen to be tested in a gradually increasing amount determined by the amount of solid particles of mass discharging from a container, in combination, a suspended axially symmetrical container having an axial well, openings from the container into the well, an annular slide movable in the well, resilient means tending to move said annular slide upwardly past said opening, a threaded extension at the lower end of said container, a collar vertically adjustable on said extension, a funnel below said container and coaxially therewith, lost-motion means extending axially from the throat of said funnel, a lever carried by said collar serving both to engage the lower end of said annular slide and to support said lost-motion means adapted to release said annular slide when the container has risen to the limit of lost motion permitted by said device.

19. In a testing machine of the type in which a gradually increasing load is applied to the specimen to be tested and the load applied is determined by the amount of solid particles discharged from a container and the flow of particles is automatically terminated upon the rupture of the specimen, in combination, a scale beam, a container carried by said beam, movable particles in said container, a discharge opening in said container, a vertically movable gate adapted to interrupt the flow of particles through said discharge opening when the gate is elevated, a latch carried by the container holding said gate in its lower and open position, a spring means tending to elevate the gate to closed position, latch-tripping mechanism carried by the container and extending below a fixed portion of the machine that is adapted to trip the latch when the container moves sharply upward on the breaking of a specimen but is unresponsive to oscillation of the container within a narrow range.

KENNETH M. LEE.
MARK F. LINDSEY.

REFERENCES CITED

The following references are of record in the file of this patent:

UNITED STATES PATENTS

| Number | Name | Date |
|---|---|---|
| 758,418 | Cock | Apr. 26, 1904 |
| 774,212 | Tretch | Nov. 8, 1904 |
| 733,133 | Bramwell | July 7, 1903 |
| 2,363,155 | Smith | Nov. 21, 1944 |